United States Patent [19]

Mitomi

[11] Patent Number: 4,506,419
[45] Date of Patent: Mar. 26, 1985

[54] PART-FIXING CLIP

[75] Inventor: Seiji Mitomi, Chigasaki, Japan

[73] Assignee: Nifco Inc., Yokohama, Japan

[21] Appl. No.: 515,719

[22] Filed: Jul. 20, 1983

[30] Foreign Application Priority Data

Aug. 20, 1982 [JP] Japan .............................. 57-124909[U]

[51] Int. Cl.³ ........................ A44B 17/00; A44B 21/00
[52] U.S. Cl. ...................................... 24/297; 24/289;
24/292; 24/573; 411/508
[58] Field of Search .................. 24/297, 289, 292, 573;
411/508, 509, 510

[56] References Cited

U.S. PATENT DOCUMENTS

| 2,749,789 | 6/1956 | Sam ........................................ 411/508 |
| 2,946,612 | 7/1960 | Ahlgren ................................ 411/510 |
| 3,038,223 | 6/1962 | Fiddler .................................... 24/292 |
| 3,803,670 | 4/1974 | Johnson ................................ 411/508 |
| 3,893,208 | 7/1975 | Yuda ...................................... 411/508 |
| 4,285,103 | 8/1981 | Inamoto ................................ 411/508 |
| 4,393,561 | 7/1983 | Yuda ...................................... 24/297 |
| 4,422,222 | 12/1983 | Notoya .................................. 24/297 |

FOREIGN PATENT DOCUMENTS

| 99435 | 7/1980 | Japan . |
| 6906 | 1/1981 | Japan . |
| 888567 | 1/1962 | United Kingdom .................. 24/297 |
| 997710 | 7/1965 | United Kingdom ................ 411/508 |

Primary Examiner—Victor N. Sakran
Attorney, Agent, or Firm—J. R. Halvorsen; T. W. Buckman

[57] ABSTRACT

A clip comprises a male member and a female socket both molded of plastics. The male member is adapted to be detachably fastened to a substrate such as a panel of an automobile body and the female socket is adapted to accommodate the male member rotatably therein and to be fastened to a part such as a radiator grille. Union of the substrate and the part accomplished by the use of this clip can be easily broken by causing the male member to be rotated relative to the female socket with a tool such as a screw driver.

4 Claims, 9 Drawing Figures

PART-FIXING CLIP

BACKGROUND OF THE INVENTION

This invention relates to a part-fixing clip adapted to be interposed between two objects and used to fasten them separably to each other, and more particularly to improvements in and concerning the clip to be used for separably fastening any of various parts such as a radiator grille or a side flasher lamp cover to the body panel of an automobile.

Japanese patent application Disclosure Nos. 99435/1980 and 6906/1981, for example, suggest clips for separably fastening a radiator grille to the panel of an automobile. The former clip is substantially in the shape of an anchor. With two legs folded back aslant from the leading end of a central shank thereof, this clip is inseparably fastened to the automobile panel. With the head of any shape other than a circle formed at the other end of the central shank, the clip separably fastens the radiator grille to the automobile panel. To remove the radiator grille from the automobile panel, the central shank of the shape of a strip must be twisted. During prolonged use, the central shank is embrittled by aging. When the radiator grille is removed from the automobile panel as for inspection or repair or when it is subsequently replaced on the automobile panel, there is the possibility that the twisting given to the central shank will tear it off the rest of the clip. When the central shank is still in good shape and the force exerted to twist it is removed, the shank regains its original shape. When the radiator grille has been fastened to the automobile panel with a plurality of such clips, desired separation of this radiator grille cannot be obtained unless the central shanks of all these clips are simultaneously twisted. Thus, this separation work requires a number of workers.

The latter clip has two anchor-shaped engaging parts symmetrically formed one each at the opposite ends of a central shank with the legs thereof falling outside. The radiator grille desired to be fastened to the automobile panel is provided with a socket having formed on the inner wall thereof engaging projections capable of retaining one of the two engaging parts rotatably therein. The automobile panel is provided with an oblong hole capable of admitting the other engaging part in such a manner as to permit withdrawal of the admitted engaging part depending on the direction in which the engaging part is held with respect to the hole. Thus, desired union of the radiator grille with the automobile panel is accomplished by forcing one of the engaging parts of the clip into the socket and the other engaging part into the oblong hole. To separate the radiator grille, the clip is turned to the particular direction in which the oblong hole is allowed to release the engaging part and then the clip which is still attached to the radiator grille is removed in situ from the automobile panel. In this case, the radiator grille is required to be provided with a socket of a complicate design. Besides, while the radiator grille by nature is expanded or contracted by changes in temperature, this clip is not capable of absorbing these changes in the size of the radiator grille.

SUMMARY OF THE INVENTION

This invention is the outcome of an effort directed to overcoming the unfavorable state of affairs described above. An object of this invention is to provide a part-fixing clip which enables a part such as a radiator grille to be readily fastened to a substrate such as an automobile body and which permits the fastened part to be removed from the substrate when necessary.

To accomplish the object described above according to the present invention, there is provided a clip which comprises a male member capable of being fixed in a hole bored in advance in a substrate such as an automobile body in such a manner as to be extracted therefrom depending on the direction in which the male member is held with respect to the hole and a female socket capable of retaining the male member rotatably with some clearance within the inner wall thereof and immovably in the axial direction thereof and further capable of being fixed to a part such as a radiator grille.

The male member is inserted into the female socket from one side thereof and is rotatably retained in position by the other side of the female socket. The female socket is provided with an engaging part adapted to be fastened to a given part. This engaging part is fixed in a fitting hole bored in advance in the part. The male member retained inside the female socket is provided at one end thereof with an anchor leg adapted to be fixed in a fitting hole bored in advance in the substrate. Consequently, the part is fastened to the substrate. Desired separation of the part from the substrate is obtained by imparting rotation to the male member through the other end of the female socket thereby enabling the male member to be extracted through the fitting hole of the substrate.

The other objects and characteristic features of the present invention will become apparent to those skilled in the art as the disclosure is made in the following description of a preferred embodiment, as illustrated in the accompanying drawings.

DESCRIPTION OF THE PREFERRED EMBODIMENTS

Figure 1:
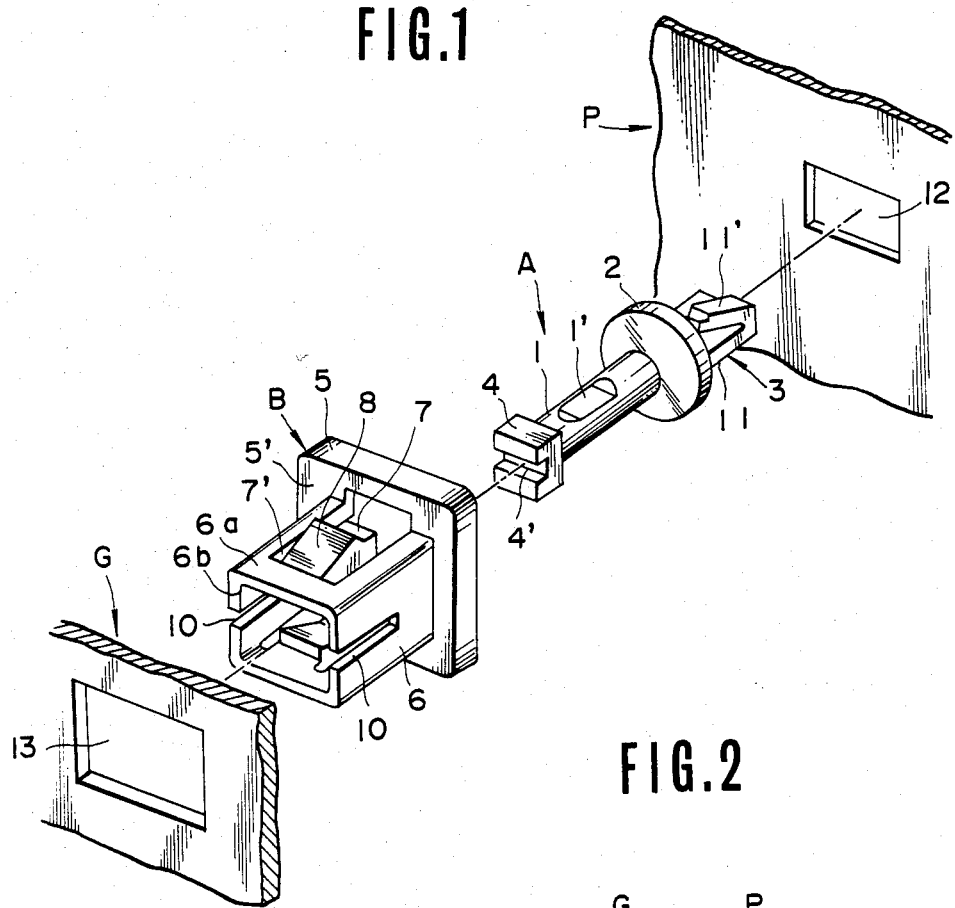
FIG. 1 is a perspective view of a typical clip of this invention in an exploded state.
Figure 2:
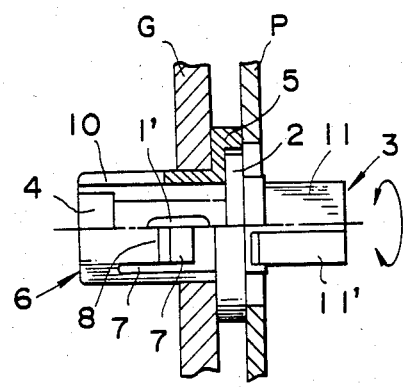
FIG. 2 is a partially sectioned plan view of the clip of FIG. 1 in a state assembled for actual use.
Figure 3:
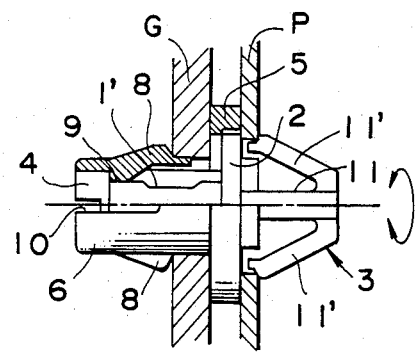
FIG. 3 is a partially sectioned side view of the same clip.
Figure 4:
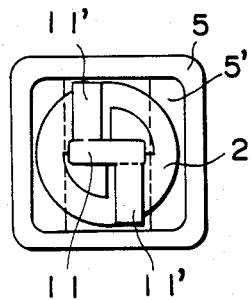
FIG. 4 is a front view of the same clip.
Figure 5:
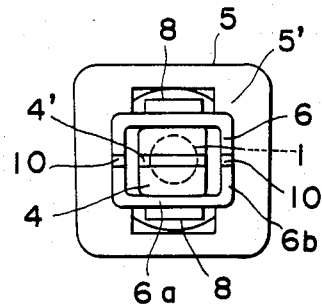
FIG. 5 is a rear view of the same clip.

This invention relates to a clip which enables a part such as a radiator grille to be fastened to a substrate such as a panel of an automobile body in such a manner as to permit the part, when necessary, to be readily separated from the substrate. In the drawings, P stands for a substrate such as a panel of an automobile, G for a part such as a radiator grille, and A and B respectively for a male member and a female socket which are separately molded of plastics and which make up the clip of the present invention. In the embodiment illustrated in FIGS. 1-7, the male member A integrally comprises a shank 1, a circular flange 2 expanded radially from the periphery of a front end of the shank, an engaging head 3 projected forwardly from the flange 2, and an operating part 4 having a polygonal shape, a square in the present embodiment, and disposed as expanded from the periphery of the rear end of the shank. Although the shape of the cross section of the shank 1 is not a critical element, the shank in this embodiment is illustrated as having a circular cross section. The female socket B comprises a frame member for accommodating the flange 2 of the male member rotatably with some clearance therebetween and a barrel member 6 projected rearwardly from the rear side of the frame member and adapted to pass the operating part 4 of the shank 1 therethrough. The barrel member has a rectangular cross section defined by major sides 6a amply greater than one side of the square operating part 4 and minor sides 6b only somewhat greater than the aforementioned side. At its front end, the barrel member opens in the bottom 5' of the frame member. In each of the major sides 6a of the barrel member, a tongue piece 7 having the free end thereof directed toward the front end is formed by insertion of a cut 7' of the shape of three sides of a square. Each of the tongue pieces 7 has formed on the outer side thereof a protuberance of a triangular cross section. This protuberance and the rear side of the frame member 5 defines an engaging part 8 serving to take hold of the radiator grille G. On its inner side, the barrel member is provided with a retaining part 9 which is formed of an inclined cam surface which the operating part 4 rides on and slides past and a contact surface which is formed behind the cam surface and is destined to come into contact with the front side of the operating part. In each of the minor sides 6b of the barrel member, a cut groove 10 is formed halfway from the rear end toward the front end.

Figure 6:
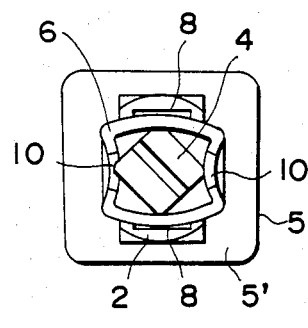
FIG. 6 is a rear view of the clip, with the male member thereof in a state turned halfway through the entire angle of rotation.
Figure 7:
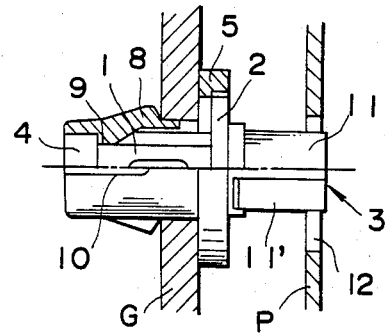
FIG. 7 is a partially sectioned side view of the same clip, with the male member thereof turned by 90° from the position thereof shown in FIG. 3.

When the male member A is forced, with the operating part 4 thereof in the lead, in the frame part 5 of the female socket B toward the interior of the barrel member 6, the operating part 4 rides on the cam surface of the retaining member 9 opposed thereto, advances on the cam surface while outwardly bending the tongue piece 7 incorporating the retaining part out of its way, and collides against the contact surface and consequently ceases its advance in the axial direction. At this point, the operating part 4 becomes immovable also backwardly in the axial direction because the rear side of the flange 2 at the front end of the shank collides against the bottom of the frame part 5. Consequently, the male member A is retained immovably in the axial direction by the female socket B. The engaging head 3 of the male member protrudes from the open front side of the frame part of the female socket. Since the flange 2 of the male member enters the frame member 5 with some clearance and the front side of the operating part 4 is held fast in position as kept in tight contact with the retaining member 9 of the female socket, the male member is allowed to make translational motion to some extent along the major sides 6a within the barrel member 6 of a rectangular cross section as indicated by the arrow in FIG. 2 and, at the same time, to produce a slight swinging motion in the direction perpendicular to the direction of the translational motion with the contact surface of the retaining member 9 as a fulcrum. By the rotation of the male member, the operating part 4 can be made to rotate within the barrel member 6 crisply with snaps while causing the rear end part of the barrel member to be pushed open from inside as illustrated in FIG. 6 by virtue of the cut grooves 10.

The engaging head in the present embodiment is in the shape of an anchor, comprising a central shank 11 projected forwardly from the center of the flange 2 and two legs 11' raised aslant backwardly from the front end of the central shank. The anchor legs are expected to be fastened to the substrate as disposed in the vertical direction.

The female socket is expected to be fastened to the radiator grille with the major sides 6a of the barrel member 6 posed in the vertical direction.

Thus, in the substrate P there is formed in advance a horizontally oblong hole 12 of a size such that the upper and lower edges of the oblong hole will cause the anchor legs 11', while these legs are being forced in as held in a vertical direction, to be bent down toward the central shank 11, and take firm hold of the rear ends of the anchor legs while the legs are on the verge of substantially completing their passage through the hole and are in the process of bouncing back to their original shape after the frame member 5 or the front side of the flange 2 has collided against the front side of the substrate (FIG. 3) and the two lateral edges of the oblong hole will clearly separate from the anchor legs when these legs are turned until horizontal by the rotation of the clip by 90°. In the radiator grille G, a similarly oblong rectangular hole 13 matched to the profile of the barrel member 6 is bored at a position corresponding to the position of the hole 12. In order that the clip may be easily rotated by 90° from the position in which the anchor legs are held in fast engagement with the upper and lower edges of the oblong hole 12, the anchor legs are desired to be disposed in such a manner that one of them will rise aslant backwardly from the righthand or lefthand half of the leading end of the central shank and the other will fall aslant backwardly from the remaining half of the leading end.

The male member and the female socket are fastened to each other as described above. Then, the barrel member 6 of the female socket is forced into the hole 13 of the radiator grille manufactured by a grille producer. Alternatively, the barrel member is pushed in position in the hole 13 in a shop where the radiator grille is fastened to the automobile body. The engaging part 8 consequently rides over the upper and lower edges of the hole 13, then passes through the hole 13 while causing the tongue piece 7 to be bent inwardly, and after completing the passage through the hole, snaps and bounces back to its original shape and comes to pinch the grille between itself and the rear side of the frame member 5. Then, it is turned and set fast in position. To prevent the central shank 1 from obstructing the inward bend of the tongue piece 7, it may be provided on the upper and lower sides thereof with notches 1'.

After the plurality of holes 13 formed as spaced in the radiator grille have been fitted each with the clip of this invention, the engaging heads 2 protruding from the frame parts 5 or the front sides of the flanges 2 of the clips are correctly opposed to the corresponding holes in the panel of the automobile body and pushed in these holes. Consequently, the engaging heads force their way into the holes 12 as described above and take firm hold of the panel in conjunction with the frame part or the front side of the flange. Even when there is slight deviation between the holes 13 in the grille and the corresponding holes 12 in the panel or when the holes 13 are slightly displaced from the corresponding holes 12 because of the expansion or contraction of the radiator grille, the union between the panel and the radiator grille can be safely obtained because the male members are allowed to make slight translational motion sideways and slight swinging motion vertically within the respective female sockets.

Desired separation of the radiator grille from the automobile panel is accomplished by rotating the male members 90° clockwise or counterclockwise by manipulation of the operating part 4 thereby aligning the engaging heads with the holes 12 of the panel. Consequently, the operating members are enabled to rotate while temporarily pushing open outwardly the rear parts of the barrel members 6 by virtue of the cut grooves 10 as illustrated in FIG. 6. These operating parts, once so rotated, do not return to their original positions. Thus, there is no possibility that the engaging heads already aligned to the holes 12 will spontaneously return to their former positions while the male members of the other clips are being rotated. When the union of the radiator grille and the panel is effected by the use of a plurality of clips, therefore, the separation of the radiator grille from the panel can be successfully performed by just one worker. The subsequent replacement of the separated radiator grille to the panel may be effected by first causing the engaging heads aligned to the holes in the panel to be inserted into the holes 12 and subsequently rotating the inserted engaging heads 90° or by first rotating the engaging heads 90° and subsequently inserting the rotated engaging heads into the holes.

Figure 8:
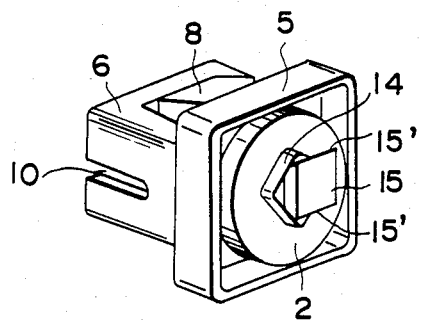
FIG. 8 is a perspective view of another typical clip of the present invention.
Figure 9:
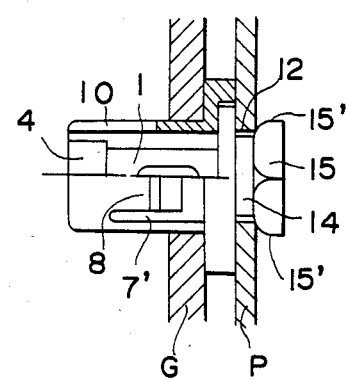
FIG. 9 is a partially sectioned plan view of the clip of FIG. 8 in a state of actual use.

The embodiment illustrated in FIG. 8 and FIG. 9, is identical with the embodiment described above, except that the engaging head 3 at the front end of the male member is in the shape of a regular polygon instead of the shape of an anchor mentioned above.

The engaging head 3 is provided on the front side of the flange 2 with a neck 14 and further on the front side of the neck with a front end plate 15. The neck 14 has a thickness substantially equal to the thickness of the panel of the automobile and an area of the shape of a regular polygon, specifically a square in the present embodiment. The front end plate 15 is substantially identical in size and shape with the neck 14 and is disposed coaxially with and askew relative to the neck 14. In the present embodiment, since the neck and the front end plate are both square in area, they cross each other at an angle of 45°.

The holes to be bored in advance in the panel of the automobile body are in the shape of squares slightly larger than the squares of the necks and the front end plates. The front end plates 14 of the engaging heads are fitted into the holes 12 and then the male members are rotated by 45° by the manipulation of the operating parts 4. Consequently, the necks 14 are completely admitted into the holes 12 and the corners 14' of the front end plates held askew relative to the necks pinch the edges of the holes 12 between themselves and the frame members 5 or the front sides of the flanges 2, establishing union between the radiator grille and the automobile panel. Desired separation of the radiator grille from the panel is effected simply by again rotating the male members 45°.

The neck 14 is given a thickness slightly smaller than the thickness of the panel of the automobile body and the corners 15' of the front end plate are slanted on the rear side of the plate. When the front end plate is set in position inside the hole 12 and then rotated by 45°, therefore, the neck 14 is allowed to enter the hole smoothly by the slanted corners 15' serving as a guide. Thus, the rear sides of the corners of the front end plate are desired to be such that even where there occurs slight variation in the thickness of the automobile panel, the corners will fasten the edges of the hole 12 effectively against the frame member of the front side of the flange.

For the male member to be rotated as contemplated, the present embodiment has the operating part 4 provided on the rear end side thereof with a slot 4' for receiving the tip of a screw driver. Instead of this single slot, there can be provided two intersecting slots forming a cross. Optionally, the rear portion of the operating part may be extended past the rear end of the barrel member 6 so that the protruding tip of the extended portion may be nipped with a pair of pliers and turned.

Since the present invention is constructed as described above, desired union of a given part and an automobile panel through the medium of clips of the present invention is accomplished by first fastening the barrel members 6 in the male members of such clips to the holes 12 bored in advance in the automobile panel and subsequently allowing the engaging heads in the male members to set the part fast in position on the panel.

In accordance with this invention, there is provided a clip which effects the union of a substrate and a part by first having the clip fastened to either the substrate or the part and subsequently allowing whichever remains to be detachably joined to the clip, without entailing the disadvantages suffered by the conventional clips.

What is claimed is:

1. A part-fixing clip capable of providing detachable union of a substrate and a part which has rectangular holes or predetermined dimensions bored one each in advance therein, which clip comprises a male member and a female socket both molded of plastics, said male member being provided with a shank, a flange disposed at the front end of said shank, an engaging head extended from the front end of said flange and adapted to be passed through the rectangular hole in said substrate and engaged with a pair of longer edges of the rectangular hole in said substrate in a straddling state, and an operating part disposed at the opposite rear end of said shank, said female socket being provided with a frame part accommodating said shank flange rotatably with some clearance therebetween and permitting said engaging head to be projected out of the font side thereof and having an opening, and a barrel projected from the bottom of said frame part to surround said opening and adapted to rotatably retain therein, said shank and said operating part on a non-returnable fashion, the inside of said barrel part having a resilient shape permitting said operating part retained therein to produce rotary and translational motion in one direction while precluding axial movement relative to said barrel, the outside of said barrel part having a shape substantially conforming to the predetermined dimensions of said rectangular hole in said part, and the outer periphery of said barrel part being provided with engaging parts for engagement with said part, said engaging head of said male member being capable of being disengaged from said pair of longer edges of the rectangular hole in said substrate by rotating said male member relative to said female socket having said part engaged therewith by resilient distortion of said female socket without disengagement of said socket from said part.

2. A clip according to claim 1, wherein said engaging head of said male member comprises a central shank projected forwardly from the center of said flange and two anchor legs extended aslant backwardly from the front end of said central shank.

3. A clip according to claim 1, wherein said engaging head of said male member comprises a neck having a regular polygonal cross-section extending from the front surface of said flange and a front end member fixed to the front side of said neck and having a cross-section substantially equal, to said neck but disposed in angular relation thereto, both said end member and said neck being complimentary to said hole whereby telescopic introduction of said male member into said hole followed by its fractional turn results in corners of said front end member underlying said part and said neck being disposed in a complimentary attitude within said hole.

4. A clip according to claim 1, wherein said operating member at the rear end of said male member is provided with a slot for receiving the tip of a tool such as a screw driver designed to impart rotation to said operating part.

* * * * *